May 15, 1934.  C. A. STEELE  1,958,868
HILL DROPPING ATTACHMENT FOR PLANTERS
Filed May 11, 1933  2 Sheets-Sheet 1
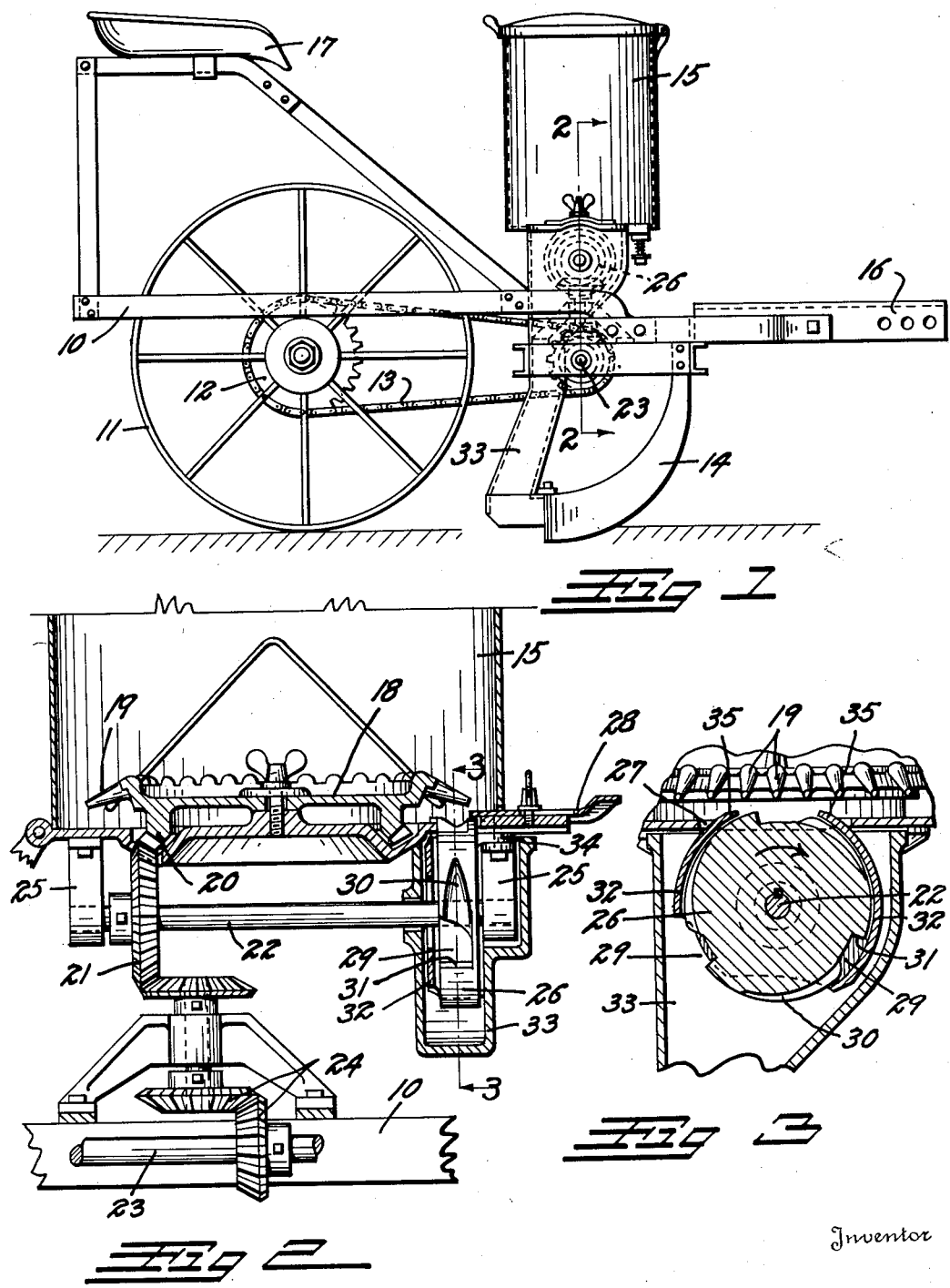
Inventor
CLAUDE A. STEELE
By
Attorney May 15, 1934.  C. A. STEELE  1,958,868
HILL DROPPING ATTACHMENT FOR PLANTERS
Filed May 11, 1933  2 Sheets-Sheet 2

Inventor
CLAUDE A. STEELE
By
Attorney

Patented May 15, 1934

1,958,868

UNITED STATES PATENT OFFICE 1,958,868

HILL DROPPING ATTACHMENT FOR PLANTERS

Claude A. Steele, Cheyenne, Wyo., assignor of three-fourths to J. H. Wenandy and James A. Greenwood, Cheyenne, Wyo.

Application May 11, 1933, Serial No. 670,388

4 Claims. (Cl. 221—130)

This invention relates to an improvement in planters and is more particularly designed for use with such crops as cotton or sugar beets. The latter crops are generally planted in continuous rows which are later blocked and thinned to leave the plants in separated hills.

The principal object of this invention is to provide means for automatically planting such crops, and more particularly cotton, in hills, thus greatly reducing the amount of seed per acre and eliminating the blocking operation.

Another object of the invention is to so construct the device that it will operate positively and efficiently on irregular and tufted seeds such as cotton seeds.

A further object is to so construct the device that it can be readily attached to or detached from the conventional types of planters and drills.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a side elevation of the invention applied to a typical cotton and corn drill;

Fig. 2 is an enlarged vertical section through the hill dropping attachment taken on the line 2—2, Fig. 1;

Fig. 3 is a detail section through the seed valve wheel taken on the line 3—3, Fig. 2;

Figure 4:
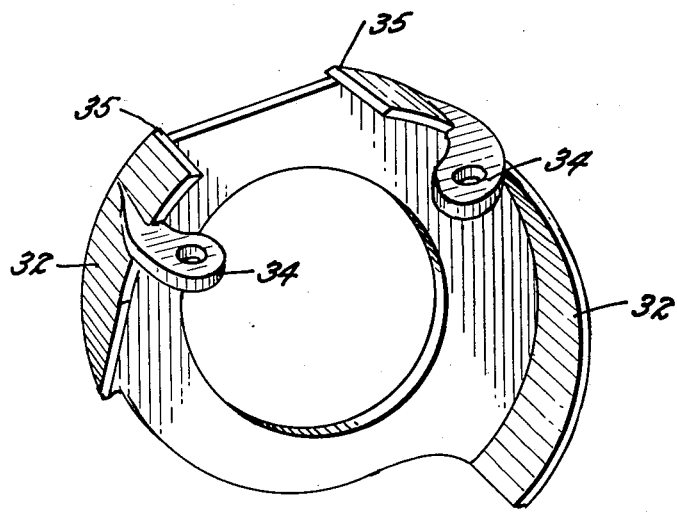
Fig. 4 is a detail perspective view illustrating the seed valve wheel guard.
Figure 5:
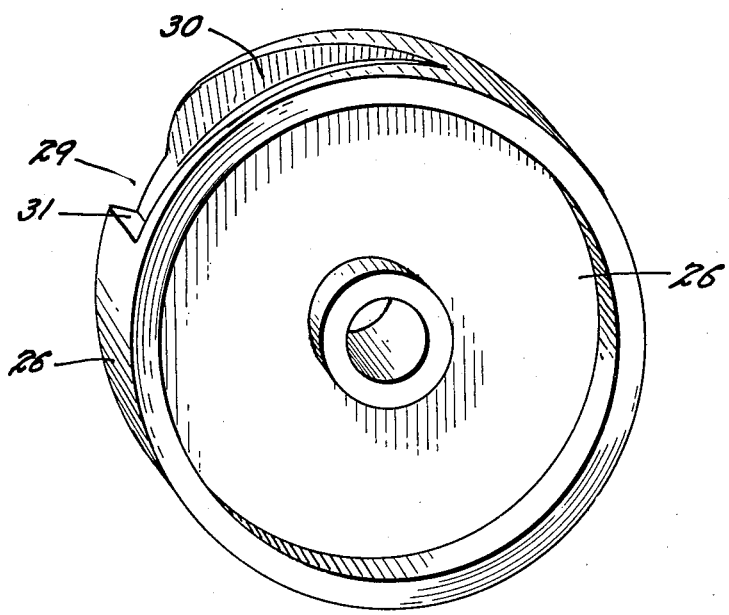
Fig. 5 is a similar detail view illustrating the seed valve wheel.

In the drawings, the conventional parts of a typical cotton or corn drill are designated by numeral as follows: frame 10, press wheels 11, drive sprocket 12, sprocket chain 13, furrow opening shoe 14, seed hopper 15 (provided with a seed discharge passage 27 controlled by a gate 28), seed chute 33, tongue 16, and seat 17. The seed hopper 15 contains a rotary seed plate 18 in its bottom, provided with projecting, peripheral, seed distributing teeth 19. The bottom of the seed plate carries bevel gear teeth 20 which mesh with a bevel pinion 21. The bevel pinion 21 is mounted on a countershaft 22 beneath the seed hopper 15.

The sprocket chain 13 drives a sprocket shaft 23 which in turn drives the countershaft 22 through the medium of suitable bevel gears 24. The countershaft 22 is carried in bearing brackets 25 secured on the bottom of the seed hopper 15. This allows the complete seed hopper and counter shaft to be tilted from the frame 10 and replaced when desired.

The mechanism thus far described is the mechanism of any typical planter and it is with this mechanism that the invention is combined. The invention comprises, what will be herein designated, a seed valve wheel 26 and a guard member 32. The valve wheel 26 is formed with a relatively wide, cylindrical rim. A series of seed pockets 29 are formed in this flat rim. These pockets are of unusual shape and consist of a rearwardly extending gradually deepening and widening portion 30 terminating in a relatively deep pocket 29 closed by means of an abrupt, laterally-extending, end wall 31. One of the side walls of each pocket is cut away so that pockets are open through the side of the valve wheel toward the axis of the hopper 15.

The guard member 32 is formed with generally circular contour to fit snugly about the wheel 26 for the major portion of its circumference, it being open at its top and bottom. The guard is provided with attachment ears 34 by means of which it may be attached to the bottom of the seed hopper 15. Two relatively sharp lips 35 extend above the ears and outline the top guard opening.

The invention is applied to the conventional type drill hopper by slipping the valve wheel 26 over the countershaft 22 and securing it thereto immediately under the seed discharge passage 27. The guard 32 is then secured to the bottom of the hopper about the valve wheel 26. When in place, the guard lips 35 and the top of the valve wheel 26 project into the bottom of the seed hopper beneath teeth of the seed plate 18.

Irregular seeds, and particularly tufted seeds such as cotton, do not drop readily through a small opening, and it has been found that if straight sided pockets are suddenly brought beneath the discharge opening 27 the seeds will not effectively fill the pockets. If, however, the pockets are formed as described with a rearwardly extending inclined portion 30, and if the edge of the wheel projects upwardly through the bottom of the hopper they operate very efficiently. This is probably due to the fact that the seeds are not required to drop through an opening or passage. The rearwardly extending portion 30 allows the lowermost seeds in the hopper to fill in ahead of the abrupt pocket end 36. The latter then simply acts to scrape off the lowermost seeds over the valve wheel and carry them under the adjacent lip 35 of the guard. The seeds are then propelled between the guard and the valve wheel until the open bottom of the former is reached. They then fall into the seed chute 33 and are deposited in the furrow in spaced-apart batches or hills. The invention can be constructed to plant any desired spacing of hills by varying the number of pockets in the wheel 26 or by varying the sprockets and gears to obtain the desired speed for the countershaft 23.

The ears 34 are spaced to coincide with the spacing of the bolts conventionally employed for holding the brackets 25 in place. This allows the entire invention to be installed upon the typical drill without additional bolts, nuts, tapped holes, or other changes. The sharp edges of the lips 35 act to cut any stalks or stems which may be with the seed.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A seed planter comprising: a seed container having a relatively flat bottom; a horizontally disposed, agitator wheel positioned on said bottom; a vertically disposed valve wheel extending through said bottom below the periphery of said agitator wheel, said valve wheel having tapered seed receiving pockets in its periphery; a cylindrical guard surrounding said valve wheel and projecting through and above said bottom, said guard being open at its top and bottom so that seeds may enter said pockets at the top and drop therefrom at the bottom; and means for rotating said agitator wheel and said valve wheel in unison.

2. A seed planter comprising: a seed container having a relatively flat bottom; a horizontally disposed, agitator wheel positioned on said bottom; a vertically disposed valve wheel extending through said bottom below the periphery of said agitator wheel, said valve wheel having tapered seed receiving pockets in its periphery, said pockets opening laterally through only one edge of said valve wheel so that seeds may be moved laterally into said pockets by said agitator wheel; a cylindrical guard surrounding said valve wheel and projecting through and above said bottom, said guard being open at its top and bottom so that seeds may enter said pockets at the top and drop therefrom at the bottom; and means for rotating said agitator wheel and said valve wheel in unison.

3. A seed planter comprising: a seed container having a relatively flat bottom; a horizontally disposed, agitator wheel positioned on said bottom; a vertically disposed valve wheel extending through said bottom below the periphery of said agitator wheel, said valve wheel having tapered seed receiving pockets in its periphery; a cylindrical guard surrounding said valve wheel and projecting through and above said bottom, said guard being open at its top and bottom so that seeds may enter said pockets at the top and drop therefrom at the bottom; means for rotating said agitator wheel and said valve wheel in unison; and relatively sharp, lateral lips formed on the opening of said guard above said bottom to cut stems etc. entering said pockets.

4. A seed planter comprising: a seed container having a relatively flat bottom having an opening; a cylindrical guard projecting through said opening into said container; relatively sharp lateral lips defining an opening in the top of said guard above said bottom; a vertically disposed valve wheel within said guard; a horizontally disposed distributor wheel in the bottom of said container above said guard; and means for causing said two wheels to operate in unison, there being tapered pockets in the periphery of said valve wheel opening laterally through the side of said wheel to allow said distributor wheel to force seeds laterally into said pockets.

CLAUDE A. STEELE.